US008773812B1

(12) United States Patent
Gustafson et al.

(10) Patent No.: US 8,773,812 B1
(45) Date of Patent: Jul. 8, 2014

(54) SYSTEMS AND METHODS FOR PROVIDING ADSORPTIVE SURFACE COATINGS ON INTERNAL COMPONENTS OF A STORAGE DRIVE

(75) Inventors: John R. Gustafson, Los Gatos, CA (US); Frederick J. Hanke, Newark, CA (US); Jon E. Jacoby, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/324,807

(22) Filed: Dec. 13, 2011

(51) Int. Cl.
*G11B 33/14* (2006.01)

(52) U.S. Cl.
USPC .................. 360/97.22; 360/99.12; 360/99.13; 360/99.14; 360/99.15; 360/99.16; 360/99.17; 360/99.18

(58) Field of Classification Search
USPC ................................ 360/97.22, 97.12–97.18
See application file for complete search history.

(56) References Cited

U.S. PATENT DOCUMENTS 3,434,268 A * 3/1969 McKenzie ...................... 55/418
4,688,562 A * 8/1987 Buchan et al. ................ 128/889
5,273,679 A * 12/1993 Hihara et al. ................... 95/177
5,406,431 A * 4/1995 Beecroft .................... 360/97.18
6,045,916 A * 4/2000 Shimamura et al. .......... 428/408
8,159,778 B2 4/2012 Gao et al.
2001/0000381 A1 4/2001 Tuma et al.
2002/0075590 A1* 6/2002 Garikipati et al. ......... 360/97.02
2003/0090842 A1* 5/2003 Smith ........................ 360/265.9
2003/0142438 A1* 7/2003 Brown et al. .............. 360/97.02
2003/0153457 A1* 8/2003 Nemoto et al. ............... 502/402
2005/0241483 A1* 11/2005 Okada et al. ................... 96/134
2005/0263003 A1* 12/2005 Fornai et al. .................... 95/211
2006/0032371 A1 2/2006 Dauber et al.
2006/0032372 A1 2/2006 Dauber et al.
2006/0081128 A1 4/2006 Ball et al.
2007/0157588 A1 7/2007 Dauber et al.
2007/0171567 A1* 7/2007 Choi et al. ................. 360/97.02
2009/0073607 A1* 3/2009 Yu et al. ...................... 360/97.02
2010/0027154 A1* 2/2010 Sonoda ........................... 360/75
2010/0118436 A1* 5/2010 Yan et al. ................... 360/97.02
2011/0090592 A1* 4/2011 Hendriks et al. ........... 360/97.02
2011/0239862 A1* 10/2011 Davydov ........................ 95/151
2013/0088795 A1* 4/2013 Brown ....................... 360/97.14

OTHER PUBLICATIONS

Wikipedia, Polyethylene glycol, Nov. 8, 2011, http://web.archive.org/web/20111108143912/http://en.wikipedia.org/wiki/Polyethylene_glycol, 6 pgs.
Wikipedia, Diamond-like carbon, May 4, 2010, http://web.archive.org/web/20100504110447/http://en.wikipedia.org/wiki/Diamond-like_carbon, 5 pgs.

* cited by examiner

*Primary Examiner* — Wayne Young
*Assistant Examiner* — Carlos E Garcia

(57) ABSTRACT

Systems and methods for providing adsorptive surface coatings on internal components of a storage drive to adsorb contaminants are provided. One such system relates to a storage device including a magnetic media configured to store information, a head configured to read information from the media and to write information to the media, and at least one internal component selected from the group consisting of an internal surface of a housing of the storage device, a recirculation filter, an anti-disk, an actuator arm for moving the head, and a voice coil motor, where a contaminant adsorptive coating is disposed on a portion of the at least one internal component, where the contaminant adsorptive coating is configured to bond with preselected contaminants.

35 Claims, 2 Drawing Sheets

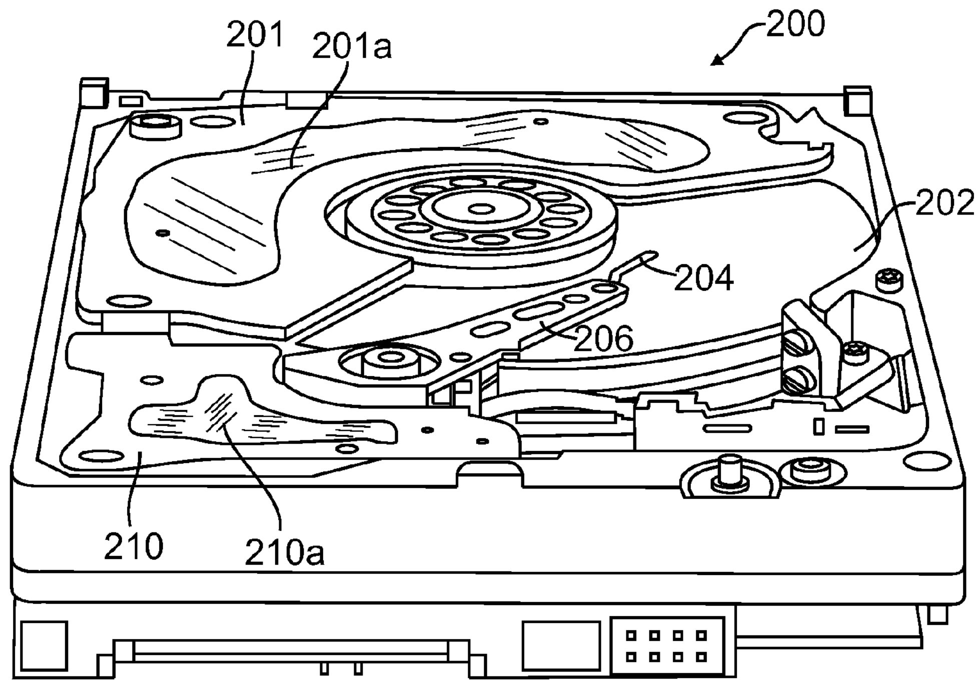

APPLY A CONTAMINANT ADSORPTIVE COATING TO AN INTERNAL COMPONENT OF THE STORAGE DEVICE, THE INTERNAL COMPONENT SELECTED FROM THE GROUP CONSISTING OF AN INTERNAL SURFACE OF A HOUSING OF THE STORAGE DEVICE, A RECIRCULATION FILTER, AN ANTI-DISK, AN ACTUATOR ARM FOR MOVING THE HEAD, AND A VOICE COIL MOTOR, WHERE THE CONTAMINANT ADSORPTIVE COATING IS CONFIGURED TO BOND WITH PRESELECTED CONTAMINANTS, AND WHERE THE STORAGE DEVICE INCLUDES A MAGNETIC MEDIA CONFIGURED TO STORE INFORMATION, AND A HEAD CONFIGURED TO READ INFORMATION FROM THE MEDIA AND TO WRITE INFORMATION TO THE MEDIA

FIG. 4

SYSTEMS AND METHODS FOR PROVIDING ADSORPTIVE SURFACE COATINGS ON INTERNAL COMPONENTS OF A STORAGE DRIVE

FIELD

The present invention relates generally to storage drive manufacturing, and more specifically, to systems and methods for providing adsorptive surface coatings on internal components of a storage drive to adsorb contaminants.

BACKGROUND

Conventional magnetic disk storage drives are highly complex devices that can be sensitive to contaminants. As such, conventional storage drives often contain activated carbon to buffer humidity and to capture organic contaminants that would otherwise disrupt or damage operation of the drives. However, the carbon based adsorbent produces particulate harmful to the operation of the storage drive and thus can require a costly inert barrier membrane (e.g., expanded polytetraflouroethylene or EPTFE type membrane) to prevent adsorbent particles from damaging the operation of the storage drive. The need to encapsulate the solid adsorbent with a particle barrier inhibits the effectiveness of the adsorbent especially to semi-volatile slow moving contaminants.

To remove vapor based contamination, the contaminant must generally first drift to the surface of the protective membrane of the solid adsorbent and diffuse through the membrane before the contaminant can become chemisorbed and bound to the inner adsorbent. This particle barrier inhibits vapor transport to the adsorbent surface. While associated with the surface of the barrier membrane, the contaminant remains free to desorb back into the drive environment. Some storage drives counter the effect of the protective membrane by significantly enlarging the surface area of the carbon based absorbers. However, great cost is associated with the increased surface area of such protective membranes.

SUMMARY

Aspects of the invention are related to systems and methods for providing adsorptive surface coatings on internal components of a storage drive to adsorb contaminants. In one embodiment, the invention relates to a storage device including a magnetic media configured to store information, a head configured to read information from the media and to write information to the media, and at least one internal component selected from the group consisting of an internal surface of a housing of the storage device, a recirculation filter, an anti-disk, an actuator arm for moving the head, and a voice coil motor, where a contaminant adsorptive coating is disposed on a portion of the at least one internal component, where the contaminant adsorptive coating is configured to bond with preselected contaminants.

In another embodiment, the invention relates to a method for providing adsorptive coatings on preselected internal components of a storage device, the method including applying a contaminant adsorptive coating to at least one internal component of the storage device, the at least one internal component selected from the group consisting of an internal surface of a housing of the storage device, a recirculation filter, an anti-disk, an actuator arm for moving the head, and a voice coil motor, where the contaminant adsorptive coating is configured to bond with preselected contaminants, and where the storage device includes a magnetic media configured to store information, and a head configured to read information from the media and to write information to the media.

BRIEF DESCRIPTION OF THE DRAWINGS

FIG. 3 is a perspective view of another storage drive with the cover removed to illustrate the head disk assembly and contaminant adsorptive coatings deposited on various internal components of the head disk assembly of the storage device including an anti-disk in accordance with one embodiment of the invention.

FIG. 4 is a flowchart of a process for depositing a contaminant adsorptive coating on various internal components of a storage device in accordance with one embodiment of the invention.

DETAILED DESCRIPTION

Figure 1:
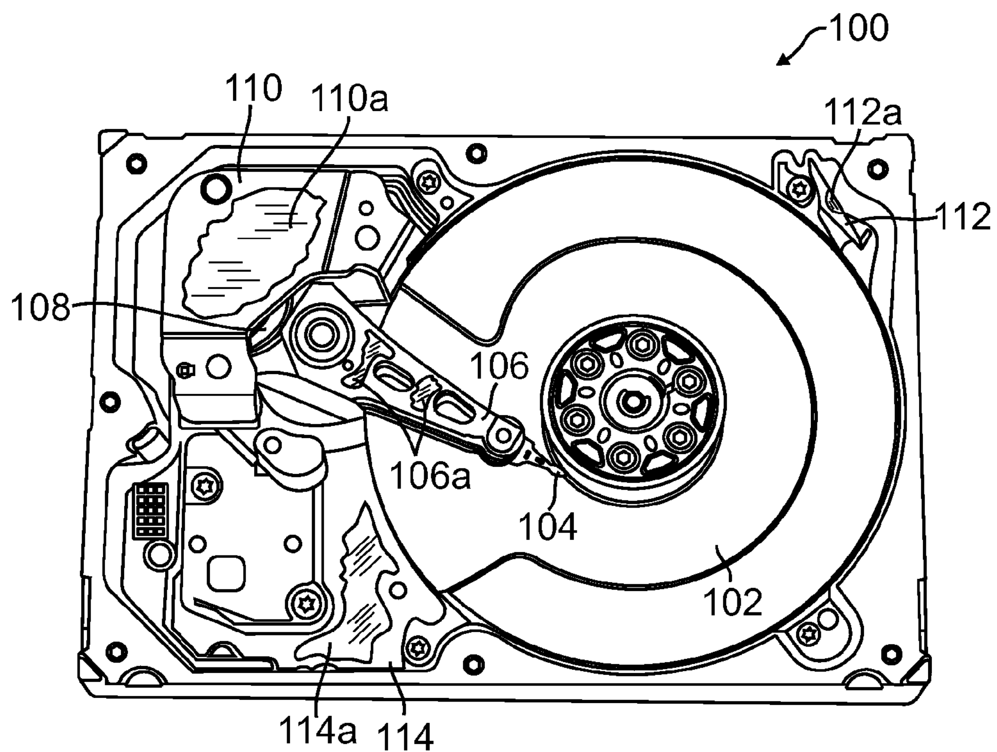
FIG. 1 is a top perspective view of a storage drive with the cover removed to illustrate the head disk assembly and contaminant adsorptive coatings deposited on various internal components of the head disk assembly of the storage device in accordance with one embodiment of the invention.

Referring now to the drawings, embodiments of storage devices having contaminant adsorptive coatings deposited on one or more internal components and processes for depositing the coatings are illustrated. The storage devices include magnetic media disks to store information and one or more heads configured to read information from the media and to write information to the media. The contaminant adsorptive coatings can be deposited on a number of internal components, including, for example, a housing of a storage device, a recirculation filter, an anti-disk, an actuator arm for moving the head, a voice coil motor, or another suitable component or component surface. The contaminant adsorptive coatings are configured to bond with preselected contaminants such as hydrocarbons or other contaminants which can be harmful to storage drive operation.

In one embodiment, the contaminant adsorptive coating can be either polyethylene glycol (PEG), diamond like carbon (DLC), or another suitable coating material for bonding with contaminants. The processes for depositing the contaminant adsorptive coatings can include applying the coatings to any of the internal components described above. In some embodiments, the deposition processes include masking a portion of an internal component or the entire internal component from coating materials.

FIG. 1 is a top perspective view of a storage drive 100 with the cover removed to illustrate the head disk assembly and contaminant adsorptive coatings deposited on various internal components of the head disk assembly of the storage device 100 in accordance with one embodiment of the invention. The storage drive 100 includes a top magnetic media disk or platter 102 and a head 104 configured to read information from, or write information to, the media 102. The head 104 is suspended above the media 102 by an actuator arm 106 (e.g., a head stack assembly) which can be moved across the media by a voice coil motor 108 having a bottom magnet (not visible) and a top magnet 110. The top magnet 110 substantially covers the rest of the voice coil motor assembly 108.

The storage drive 100 also includes a recirculation/air filter 112 positioned in a corner area of the head disk assembly for filtering the re-circulating air within the storage drive. The recirculation filter 112 is only effective against limited types of particles and only those particles that are actually routed through the filter. In addition, the filter 112 is generally only effective when the media disks of the storage drive are spinning and air is circulating. The storage drive 100 also includes a top surface 114 of the head disk assembly for enclosing additional media disks (not shown) and other internal components.

As illustrated in FIG. 1, contaminant adsorptive coatings (106*a*, 110*a*, 112*a*, 114*a*) have been deposited, respectively, on the actuator arm 106, the top magnet 110 of the voice coil motor 108, the recirculation filter 112, and the top surface 114 of the head disk assembly. In other embodiments, the contaminant adsorptive coatings can be deposited on other suitable surfaces of the head disk assembly or other areas of the storage drive 100 (e.g., disk shroud areas). By depositing the contaminant adsorptive coating 112*a* on the filter 112, the filter 112 can effectively be converted into a dual purpose filter capable of filtering both particulates and chemicals. In several embodiments, the contaminant adsorptive coatings are not deposited on the head 104 or the media 102. In one embodiment, the adsorptive coatings for one of the internal components can be deposited on the internal component by the manufacturer or vendor of that component (e.g., recirculation filter) rather than the manufacturer of the storage drive. In several embodiments, the contaminant adsorptive coatings are deposited on internal components having relatively large surface areas. However, the contaminant adsorptive coatings can be placed on virtually any available surface in the storage drive.

The contaminant adsorptive coatings are configured to bond with preselected contaminants such as hydrocarbons or other contaminants which can be harmful to storage drive operation. In several embodiments, the preselected contaminants include various organic contaminants. In a number of embodiments, the contaminant adsorptive coating can be either polyethylene glycol (PEG), diamond like carbon (DLC), or another suitable coating configured to bond with preselected contaminants (e.g., material with high affinity for preselected contaminants such as hydrocarbons). In one embodiment, the contaminant adsorptive coating can include a glycol based material. In one embodiment, the contaminant adsorptive coating takes the form of a viscous liquid. In other embodiments, the contaminant adsorptive coating can be suspended in other suitable forms. In several embodiments, the contaminant adsorptive coating is a relatively thin coating and can be placed in high risk areas of limited volume. Unlike the filter 112, the contaminant adsorptive coatings can avoid impeding air flow through the storage drive and can be effective nearly all of the time rather than only when the media disks of the storage drive are rotated.

Figure 2:
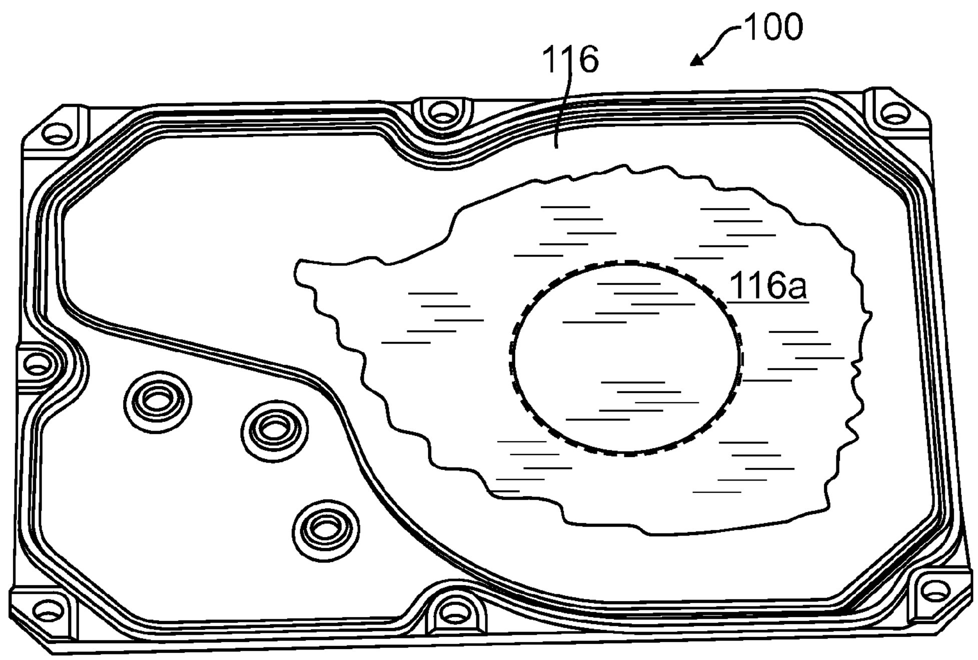
FIG. 2 is a top perspective view of the internal surface of the cover of the storage drive of FIG. 1 illustrating a contaminant adsorptive coating deposited on the internal surface in accordance with one embodiment of the invention.

FIG. 2 is a top perspective view of the internal surface of the cover 116 of the storage drive 100 of FIG. 1 illustrating a contaminant adsorptive coating deposited 116*a* on the internal surface in accordance with one embodiment of the invention.

FIG. 3 is a perspective view of another storage drive 200 with the cover removed to illustrate the head disk assembly and contaminant adsorptive coatings deposited on various internal components of the head disk assembly of the storage device including an anti-disk 201 in accordance with one embodiment of the invention. The storage drive 200 includes a top magnetic media disk or platter 202 and a head 204 configured to read information from, or write information to, the media 202. The head 204 is suspended above the media 202 by an actuator arm 206 (e.g., a head stack assembly) which can be moved across the media by a voice coil motor (not visible) having a bottom magnet (not visible) and a top magnet 210. The top magnet 210 substantially covers the voice coil motor. Contaminant adsorptive coatings (201*a*, 210*a*) have been deposited, respectively, on the anti-disk 201 and the top magnet 210 of the voice coil motor. In other embodiments, the coatings can be deposited on other suitable components.

FIG. 4 is a flowchart of a process 300 for depositing a contaminant adsorptive coating on various internal components of a storage device in accordance with one embodiment of the invention. In particular embodiments, the deposition process 300 can be used in conjunction with the storage drives of FIGS. 1-3. The process applies (302) a contaminant adsorptive coating to at least one internal component of the storage device, where the at least one internal component is selected from the group consisting of an internal surface of a housing of the storage device, a recirculation filter, an anti-disk, an actuator arm for moving the head, a voice coil motor, or another suitable component, where the contaminant adsorptive coating is configured to bond with preselected contaminants, and where the storage device includes a magnetic media configured to store information, and a head configured to read information from the media and to write information to the media.

In some embodiments, the process deposits more than one type of contaminant adsorptive coating. In some embodiments, the process further includes applying a mask to a portion of an internal component (or the entire internal component) of the storage device, depositing the contaminant adsorptive coating, and then removing the mask. In several embodiments, the application or deposition process can be a dipping process, a spraying process, a sputtering process, a vapor deposition process, or another suitable deposition process known in the art.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A storage device comprising:

a magnetic media configured to store information;

a head configured to read information from the media and to write information to the media; and at least one internal component selected from the group consisting of an internal surface of a housing of the storage device, a recirculation filter, an anti-disk, an actuator arm for moving a head of the storage device, and a voice coil motor, wherein a contaminant adsorptive coating is disposed on a portion of the at least one internal component, wherein the contaminant adsorptive coating is configured to bond with preselected contaminants comprising particles, and wherein the contaminant adsorptive coating comprises a material selected from the group consisting of polyethylene glycol and diamond like carbon.

2. The storage device of claim 1, wherein the preselected contaminants comprise organic contaminants.

3. The storage device of claim 2, wherein the organic contaminants comprise hydrocarbon.

4. The storage device of claim 1, wherein the contaminant adsorptive coating comprises a viscous liquid.

5. The storage device of claim 1, wherein the at least one internal component comprises the recirculation filter and the anti-disk.

6. The storage device of claim 1, wherein the at least one internal component comprises the internal surface of a housing of the storage device, the recirculation filter, and the anti-disk.

7. The storage device of claim 1,
  wherein the housing substantially encloses the other components of the storage device.

8. The storage device of claim 1,
  wherein the magnetic media is mounted within a housing of the storage device, and
  wherein the contaminant adsorptive coating is disposed on a surface of the anti-disk that is substantially parallel to a top surface of the magnetic media.

9. The storage device of claim 1, wherein the contaminant adsorptive coating comprises diamond like carbon.

10. The storage device of claim 1, wherein the at least one internal component is selected from the group consisting of the internal surface of the housing of the storage device, the recirculation filter, the anti-disk, and the voice coil motor.

11. The storage device of claim 1, wherein the at least one internal component comprises the anti-disk.

12. The storage device of claim 1, wherein the contaminant adsorptive coating is a material selected from the group consisting of polyethylene glycol and diamond like carbon.

13. The storage device of claim 1:
  wherein the at least one internal component comprises the anti-disk, and
  wherein the contaminant adsorptive coating is a material selected from the group consisting of polyethylene glycol and diamond like carbon.

14. A method for providing adsorptive coatings on preselected internal components of a storage device, the method comprising:
  applying a contaminant adsorptive coating to at least one internal component of the storage device, the at least one internal component selected from the group consisting of an internal surface of a housing of the storage device, a recirculation filter, an anti-disk, an actuator arm for moving a head of the storage device, and a voice coil motor,
  wherein the contaminant adsorptive coating is configured to bond with preselected contaminants comprising particles,
  wherein the storage device comprises a magnetic media configured to store information, and a head configured to read information from the media and to write information to the media, and
  wherein the contaminant adsorptive coating comprises a material selected from the group consisting of polyethylene glycol and diamond like carbon.

15. The method of claim 14, wherein the preselected contaminants comprise organic contaminants.

16. The method of claim 15, wherein the organic contaminants comprise hydrocarbon.

17. The method of claim 14, wherein the contaminant adsorptive coating comprises a viscous liquid.

18. The method of claim 14, wherein the at least one internal component comprises the recirculation filter and the anti-disk.

19. The method of claim 14, wherein the at least one internal component comprises the internal surface of a housing of the storage device, the recirculation filter, and the anti-disk.

20. The method of claim 14,
  wherein the housing substantially encloses the other components of the storage device.

21. The method of claim 14, wherein the applying the contaminant adsorptive coating comprises:
  depositing the contaminant adsorptive coating on the at least one internal component of the storage device using a process selected from the group consisting of a dipping process, a spraying process, a sputtering process, and a vapor deposition process.

22. The method of claim 14, wherein the applying the contaminant adsorptive coating comprises:
  applying a mask to the at least one internal component of the storage device;
  depositing the contaminant adsorptive coating on the at least one internal component of the storage device using a process selected from the group consisting of a dipping process, a spraying process, a sputtering process, and a vapor deposition process; and
  removing the mask.

23. The method of claim 22, wherein the at least one internal component comprises the internal surface of a housing of the storage device.

24. The method of claim 14,
  wherein the magnetic media is mounted within a housing of the storage device, and
  wherein the contaminant adsorptive coating is disposed on a surface of the anti-disk that is substantially parallel to a top surface of the magnetic media.

25. The method of claim 14, wherein the contaminant adsorptive coating comprises diamond like carbon.

26. The method of claim 14, wherein the at least one internal component is selected from the group consisting of the internal surface of the housing of the storage device, the recirculation filter, the anti-disk, and the voice coil motor.

27. The method of claim 14, wherein the at least one internal component comprises the anti-disk.

28. The method of claim 14, wherein the contaminant adsorptive coating is a material selected from the group consisting of polyethylene glycol and diamond like carbon.

29. The method of claim 14:
  wherein the at least one internal component comprises the anti-disk, and
  wherein the contaminant adsorptive coating is a material selected from the group consisting of polyethylene glycol and diamond like carbon.

30. A storage device comprising:
  a magnetic media configured to store information;
  a head configured to read information from the media and to write information to the media; and
  at least one internal component selected from the group consisting of an internal surface of a housing of the storage device, a recirculation filter, an anti-disk, an actuator arm for moving the head, and a voice coil motor,
  wherein a contaminant adsorptive coating is disposed on a portion of the at least one internal component,
  wherein the contaminant adsorptive coating is configured to bond with preselected contaminants, and
  wherein the contaminant adsorptive coating comprises diamond like carbon.

31. The storage device of claim 30, wherein the at least one internal component is selected from the group consisting of an internal surface of the housing of the storage device, the recirculation filter, and the anti-disk.

32. The storage device of claim 30, wherein the at least one internal component comprises the anti-disk.

33. A method for providing adsorptive coatings on preselected internal components of a storage device, the method comprising:

applying a contaminant adsorptive coating to at least one internal component of the storage device, the at least one internal component selected from the group consisting of an internal surface of a housing of the storage device, a recirculation filter, an anti-disk, an actuator arm for moving the head, and a voice coil motor, wherein the contaminant adsorptive coating is configured to bond with preselected contaminants, wherein the storage device comprises a magnetic media configured to store information, and a head configured to read information from the media and to write information to the media, and wherein the contaminant adsorptive coating comprises diamond like carbon.

34. The method of claim 33, wherein the at least one internal component is selected from the group consisting of an internal surface of the housing of the storage device, the recirculation filter, and the anti-disk.

35. The method of claim 33, wherein the at least one internal component comprises the anti-disk.

* * * * *